DIGITAL TO ANALOG WAVEFORM SYNTHESIZER

Filed Aug. 15, 1961 3 Sheets-Sheet 1

INVENTOR.
JOHN (NMI) MAREZ

BY

Roy Miller
ATTORNEYS

LOGIC 1 = +
LOGIC 0 = −

INVENTOR.
JOHN (NMI) MAREZ
BY
ATTORNEYS

May 11, 1965 J. MAREZ 3,183,502

DIGITAL TO ANALOG WAVEFORM SYNTHESIZER

Filed Aug. 15, 1961 3 Sheets-Sheet 3

INVENTOR.
JOHN (NMI) MAREZ

BY

ATTORNEYS 3,183,502
DIGITAL TO ANALOG WAVEFORM SYNTHESIZER
John Marez, 3407 Lockwood Drive, San Diego, Calif.
Filed Aug. 15, 1961, Ser. No. 131,688
8 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

The invention relates to a digital-to-analog waveform synthesizer and more particularly, to a solid state system designed to change precoded digital data into an analog waveform and specifically, to a digital-to-analog converter as used in a symbol generator.

In the field of alpha-numeric symbol generation, digital data is used to generate symbols on a cathode ray tube. In generating the alpha-numeric symbols it is desired to have a fast and simple method and a system for converting digital data from a digital storage system into analog voltages which may be utilized to control an electron beam in a cathode ray tube.

Thus, it is desirable that the converter be able to accept digital information and convert this digital information into analog voltages at high speeds which imposes the additional requirement that the digital to analog converter have a minimum of circuit components. Furthermore, due to the desire for a minimum of circuit components it is also desirable that the method in which the digital information is converted to analog voltages be relatively unsophisticated.

Other systems and methods of generating alpha-numeric symbols utilize complicated circuitry which normally requires a minimum of 25 micro-seconds or more to generate an individual symbol. These prior art generators normally employ a Lissajous figure type of generation which in turn requires a very stable master oscillator and extremely stable power supply. In addition, the circuitry that converts the digital logic to the analog voltages is invariably highly complicated due to the manner in which the conversion takes place.

An object of the present invention is to provide a digital-to-analog waveform synthesizer having a minimum of circuit components and capable of high speed operation.

A further object of the invention is to provide a system for converting digital information to analog voltages at high speeds.

A further object of the invention is to provide a digital-to-analog converter for use in generating alpha-numeric symbols.

An additional object of the invention is to provide a solid state system for changing precoded digital data into analog waveform.

A further object of the invention is to provide a faster and simplified method of converting digital data into analog voltages for use in the generation of alpha-numeric symbols on a cathode ray tube.

Another object of the invention is to provide a waveform synthesizer which converts precoded digital data into linear increments of a plus voltage, a zero voltage, a minus voltage, and maintains a linear transition while changing from one voltage level to an adjacent voltage level.

Various other objects and advantages will appear from the following description of one embodiment of the invention, and the novel features will be particularly pointed out hereinafter in connection with the appended claims.

In order to present a better understanding of the invention an embodiment thereof will be described and illustrated in the accompanying drawings wherein:

FIG. 2(*b*) is a sketch of the output from the negative going section of the converter;

FIG. 2(*c*) represents a typical converter output waveform composed from the positive and negative sections as shown in the embodiment of FIG. 1.

FIG. 3(*b*) is a sketch of the waveform which would be coupled to the X input of the cathode ray tube;

FIG. 3(*c*) is a sketch of a converter waveform which would be coupled to the Y input of the cathode ray tube;

FIG. 3(*d*) is a sketch of the unblank voltage which would be coupled to the cathode ray tube;

FIG. 5(*b*) is an illustration of the waveform matrix from which the alpha-numeric characters in FIG. 5(*a*) are generated.

Figure 1:
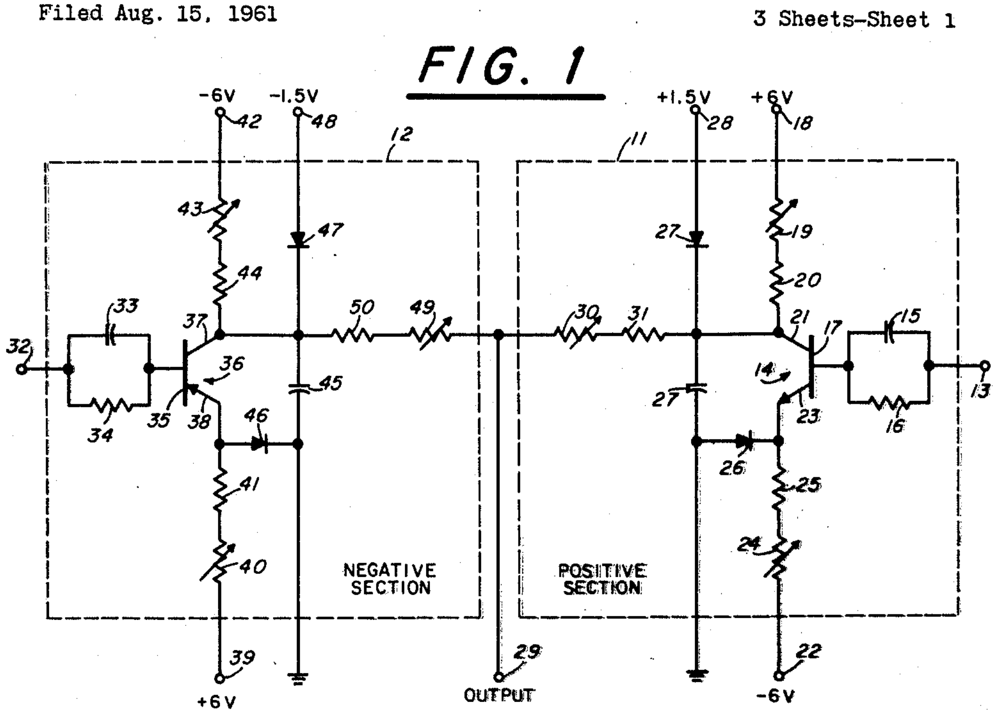
FIG. 1 is a schematic diagram of a digital-to-analog waveform synthesizer.
Figures 2A, 2B, 2C:
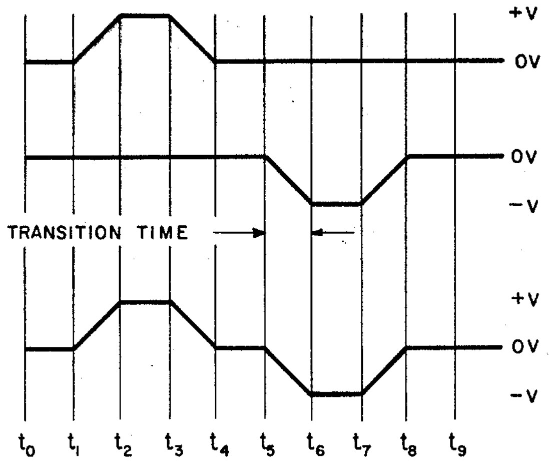
FIG. 2(*a*) is a sketch of the output waveform from the positive going section of the converter.

In the illustrated embodiment of the invention as set forth in FIG. 1, a schematic diagram of the digital-to-analog waveform synthesizer is set forth, the output of which might be the waveform illustrated in FIG. 2(*c*). The waveform as shown in FIG. 2(*a*) could be generated by the portion of the digital-to-analog waveform synthesizer inside dotted line 11 while the waveform as set forth in FIG. 2(*b*) could be generated by the portion of the digital-to-analog waveform synthesizer within dotted line 12.

The positive going waveform generating means is used to generate a waveform of a predetermined amplitude and having a positive and negative slope. In order to generate the waveform as set forth in FIG. 2(*a*) an input terminal 13 is provided to which digital information may be introduced. The digital information is coupled from the input terminal through an RC network comprising capacitor 15 and a resistor 16, connected in parallel, to a base element 17 of an NPN transistor switch 14. A positive 6 volt source connected at point 18 and coupled through a potentiometer 19 and fixed resistor 20 to a collector element 21 of transistor switch 14 to provide reverse bias on the collector element. A minus 6 volt supply is coupled to point 22 and from point 22 is connected to an emitter element 23 of transistor 14 through potentiometer 24 and resistor 25 connected in series to provide forward bias on the emitter element. Connected between the emitter element 23 and ground is a semi-conductor diode 26 which has its cathode connected to the emitter and its anode grounded. Semi-conductor diode 26 is used to clamp the emitter at ground potential when the transistor 14 is conducting.

An integrating capacitor 27 is connected between the collector element 21 and ground and collector element 21 is clamped at 1.5 volts positive by a semi-conductor diode 27 which has its anode connected to a positive 1.5 voltage supply at 28 and its cathode connected to collector 21. Connected in series between the collector element 21 and an output terminal 29 is a positive amplitude adjust potentiometer 30 and current limiting resistor 31. Potentiometer 30 and current limiting resistor also provide part of the mixing of the outputs of the two sections of the synthesizer.

The portion of the digital-to-analog waveform synthesizer enclosed within dotted line 12 is used to generate the negative going portion of the waveform as set forth in FIG. 2(*b*). This is accomplished by coupling digital information to an input terminal 32 and thence through an RC network comprising a capacitor 33 and a resistor 34, connected in parallel, to a base element 35 of a PNP transistor switch 36 having a collector element 37 and emitter element 38. Forward bias is applied on the emitter from a −6 volt source connected at point 39 through a potentiometer 40 and a current limiting resistor 41 connected in series. Reverse bias is supplied on collector element 37 from a −6 volt source connected at point 42 and coupled through potentiometer 43 and current limiting resistor 44 connected in series between point 42 and collector 37. Integrating capacitor 45 is connected between collector 37 and ground so that a waveform is produced through the opening and closing of the transistor 36 which has a linear rise and fall with respect to time. The common point of collector 37, resistor 44 and capacitor 45 is maintained at ground potential when transistor 36 is conducting through a germanium diode 46 connected between emitter element 38 and ground and having its cathode connected to ground and its anode connected to the emitter element 38. In order to maintain the aforementioned common point of resistor 44, capacitor 45, and collector 37 at a −1.5 volts when the transistor switch 36 is opened, a germanium diode 47 is connected with its cathode to collector 37 and its anode connected to a −1.5 volts supply as at terminal 48. In order to adjust the amplitude of the negative waveform and mix the output of the transistor switch 36 and transistor switch 14 a potentiometer 49 and current limiting resistor 50 are connected in series between point 29 and collector element 37 of transistor 36.

The operation of the positive portion of the digital-to-analog waveform synthesizer within dotted line 11 will only be explained in that the portion of the synthesizer within dotted line 12 functions exactly the same except that a negative going waveform is produced instead of a positive going waveform.

In the operation of that portion of the synthesizer within dotted line 11, transistor switch 14 will be switched "on" and "off" as digital information is received at input terminal 13. In that the transistor switch 14 is an NPN type and a positive pulse with respect to the emitter 23 will turn the transistor switch "on" while a negative pulse with respect to emitter 23 will turn the transistor "off." During the "off" time of the switch, capacitor 27 will charge through potentiometer 19 and current limiting resistor 20 to a voltage level of slightly less than +1.5 volts which will be determined by the germanium diode 27 which acts to clamp the collector 21 at a positive 1.5 volts. The charging time of capacitor 27 is determined by the adjustment of potentiometer 19 which along with current limiting resistor 20 and capacitor 27 determines the RC time constant of the circuit. When transistor switch 14 is switched "on" capacitor 27 attempts to charge to a −6 volts through collector 21, emitter 23, current limiting resistor 25, and potentiometer 24. However, the emitter and collector of transistor switch 14 are clamped at ground potential through semi-conductor diode 26 and therefore, the voltage level appearing at the collector and thereby the capacitor 27 varies between ground and approximately a positive 1.5 volts. The negative charging time of the capacitor 27 is determined by the RC time constant which is in turn determined by capacitor 27, current limiting resistor 25, and potentiometer 24. The slope of the waveform on the negative charge cycle of capacitor 27 may be adjusted through adjustment of potentiometer 24.

The RC coupling network comprising capacitor 15 and resistor 16, connected in parallel, is connected between input terminal 13 and base element 17 in order to speed up turn-off and turn-on time in the transistor 14.

The voltage appearaing at capacitor 27 is coupled to the output 29 through current limiting resistor 21 and amplitude adjust potentiometer 30. The potentiometer 30 and current limiting resistor 31 function in two capacities, i.e., they are used to mix the signals appearing at the outputs of the transistor switch 14 and transistor switch 36 and, in addition, the amplitude of the positive waveform that is coupled to the X or Y input of the cathode ray tube may be adjusted by adjusting potentiometer 30.

In that the portion of the digital-to-analog waveform synthesizer within dotted line 12 functions as the mirror image of the portion within dotted line 11 no explanation is believed necessary in regard thereto.

The complete synthesizer generates a waveform with three voltage levels, a plus voltage, a zero voltage and a negative voltage level as shown in FIG. 2(*c*). By using two of these waveforms, one for each axis, and through the use of proper timing and mixing it is possible to generate symbols on the face of a cathode ray tube. In FIG. 2(*b*) the switching in a straight line between adjacent voltage levels is the time interval which will be defined as the transition time and it will be further noted that the symbol waveforms will be multiples of the transition time unit.

As set forth above, any linear portion of the waveform is a multiple of the transition time. For example, if a megacycle clock rate is used, the transition time will equal one microsecond and the times of the linear portions of the usable waveforms will be multiples of one microsecond. In addition, the closing and opening of transistor switches 14 and 36 will be done only at the beginning or ending of the transition time in synchronism with the clock rate.

Once the desired waveform is obtained for a given clock rate through adjustment of resistors 43, 19, 40, 24, 49 and 30, there is no more need for a continuous adjustment. However, if the clock rate is changed, i.e., either increased or decreased, it will be necessary to adjust the aforementioned resistors until a desired waveform is acquired and once again established would remain fixed. Thus, in FIG. 2(*a*) transistor switch 14 is "off" during the time intervals between $t_1$–$t_3$ while transistor switch 36, as represented in FIG. 2(*b*), is "off" from time $t_5$–$t_7$. During all other times the transistor switches 14 and 36 are "on." FIG. 2(*c*) illustrates the algebraic sum of the waveforms of FIG. 2(*a*) and 26 which would appear at output 29 and which would be coupled to the X or Y input of a cathode ray tube.

Figure 3A:
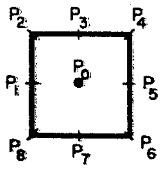
FIG. 3(*a*) illustrates a square and dot configuration generated on the face of the cathode ray tube.
Figures 3B, 3C, 3D:
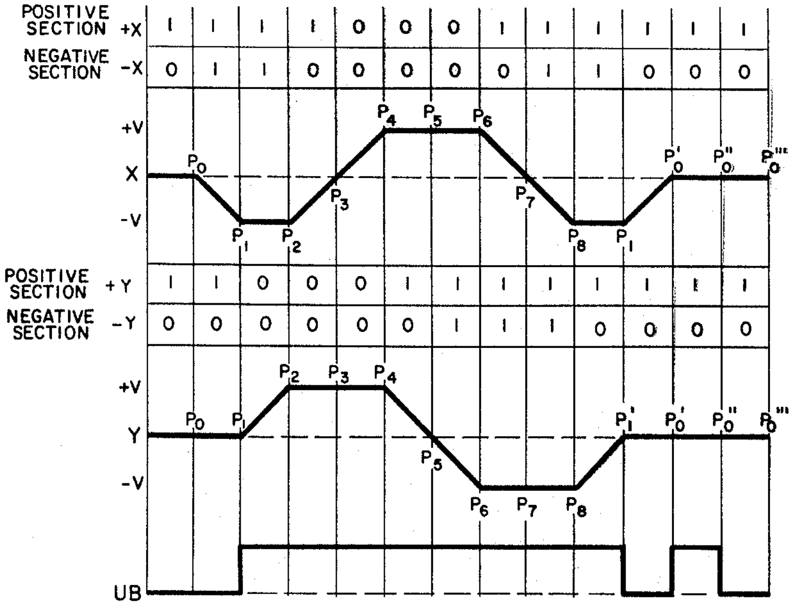

Now let it be assumed that it is desired to generate a square with a dot contained therein on the face of a cathode ray tube. In order to do this, two circuits of the type set forth in FIG. 1 would be used, one for the X input of the cathode ray tube and one for the Y input of the cathode ray tube. In addition, an unblanking voltage would be needed which would be coupled to the cathode ray tube unblanking circuit thereby allowing the electron beam to illuminate the phosphor screen at a time determined by the digital logic. FIG. 3(*a*) indicates the square in dot configuration while FIG. 3(*b*) illustrates the waveform that would be coupled from an output point 29 to the X input of the cathode ray tube while FIG. 3(*c*) illustrates the waveform that would be coupled from an output such as point 29 of another equivalent circuit to the Y input of the cathode ray scope tube. FIG. 3(*d*) indicates the waveform voltage levels that would be coupled to the unblank portion of a cathode ray tube in order to generate the square and dot configuration of FIG. 3(*a*).

Above FIG. 3(*b*) is set forth the logic that would be coupled to inputs 32 and 13 of a circuit as shown in FIG. 1, for example, to generate the waveforms for the X output; wherein a logic 1 represents a plus voltage and a logic 0 equals a minus voltage. Thus, with reference to FIG. 1, during the interval $P_0$ to $P_2$ and $P_7$ to $P_1$ transistor switch 36 is turned "off." At all other times transistor switch 36 would be "on." During the interval $P_3$ to $P_6$ transistor switch 14 would be turned "off" while at all other intervals transistor switch 14 would be turned "on."

The logic levels above FIG. 3(*c*) illustrate the digital information that would be coupled to the inputs 32 and 13 of a circuit as set forth in FIG. 1 which would be used to generate the waveform which would be coupled to a Y input of the cathode ray tube.

FIG. 3(*d*) illustrates the voltage level that would be coupled to the unblank circuit of the cathode ray tube. From $P_1$ to $P_1'$ and $P_0'$ to $P''$ the cathode ray tube is unblanked.

Figure 4:
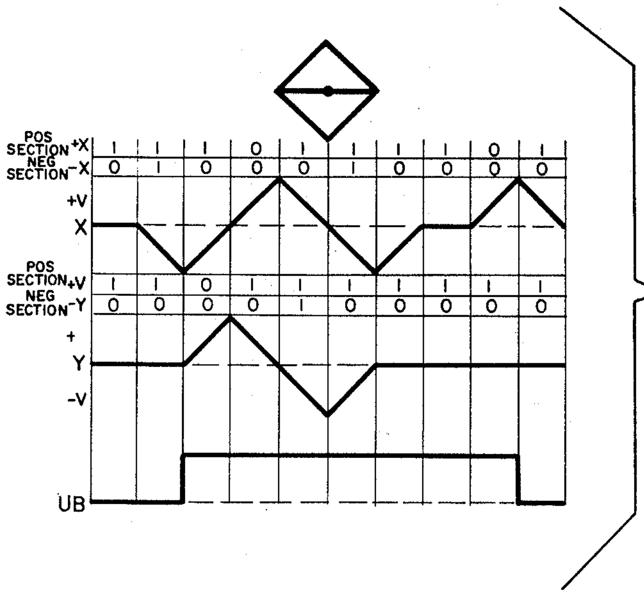
FIG. 4 is a diamond symbol and the X, Y and unblank voltage waveforms used to produce it.

FIG. 4 illustrates the X and Y waveforms and the unblanked voltage which would be applied to a cathode ray tube to generate the diamond configuration on the face of the cathode ray tube. The logic levels above the X and Y waveforms represent the digital logic which would be coupled to input terminals 32 and 13 in each of the synthesizers which would be required to produce the X and Y waveforms.

Figure 5A:
FIG. 5(*a*) is a chart of representative alpha-numeric characters which may be generated through the use of the present system.
Figure 5B:
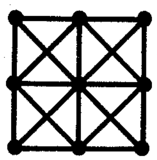

FIG. 5(*b*) illustrates the waveform matrix from which the alpha-numeric symbols of FIG. 5(*a*) are formed. The numbers below each of the alpha-numeric symbols represents the time interval required to generate the symbol.

Thus, a high speed digital-to-analog waveform synthesizer is realized which incorporates a relatively small number of circuit elements and which can be readily adjusted to various clock rates. In addition, once adjusted for a desired clock rate no further continuous adjustment is needed. Furthermore, the present digital-to-analog waveform synthesizer expedites the generation of a character in a maximum of 12 microseconds thereby resulting in an increase of speed at a one megacycle clock rate of 13 microseconds over systems that require a minimum of 25 microseconds.

It will be understood that various changes in the details, materials and arrangements of parts, which have been herein described and illustrated in order to explain the nature of the invention, may be made by those skilled in the art within the principle and scope of the invention as expressed in the appended claims.

What is claimed is:

1. A digital to analog waveform synthesizer for generating a waveform having a positive going portion with respect to a zero reference axis and a negative going portion with respect to said zero reference axis comprising; positive going waveform generating means including, input means for coupling digital information thereto, a positive voltage supply, switching means operatively coupled to said input means and said positive voltage supply for turning on and off said positive voltage supply in response to digital information coupled thereto from said input means, integrating means connected to the output of said switching means for integrating the output from said switching means thereby generating a substantially linear waveform when said switch is turned off and on; negative going waveform generating means including, input means for coupling digital information thereto, a negative voltage supply, switching means operatively coupled to said input means and said negative voltage supply for turning on and off said negative voltage supply in response to digital information coupled to said switching means, integrating means operatively coupled to the output of said switching means for integrating the output from said switching means thereby generating a substantially linear waveform when said switch is turned off and on; and mixing means operatively coupled to said integrating means included in said negative going waveform generating means and operatively coupled to said integrating means for mixing the outputs from said positive going waveform generating means and negative going waveform generating means thereby producing an output waveform which represents the algebraic sum of said negative going and positive going waveforms.

2. A digital to analog waveform synthesizer as set forth in claim 1 wherein said mixing means comprises, negative amplitude adjust means operatively connected to said integrating means included in said negative going waveform generating means and positive amplitude adjust means operatively coupled to said integrating means included in said positive going waveform generating means.

3. A digital to analog waveform synthesizer as set forth in claim 1 and further including negative voltage level clamping means operatively coupled to said integrating means included in said negative going waveform generating means for clamping the output of said integrating means at a predetermined negative value, and positive voltage level clamping means operatively coupled to said integrating means included in said positive going waveform generating means for clamping the output of said integrating means at a predetermined positive voltage level.

4. A digital to analog waveform synthesizer as set forth in claim 1 wherein said switching means included in said positive going waveform generating means and said switching means included in said negative going waveform generating means are electronic switches.

5. A digital to analog waveform synthesizer as set forth in claim 1 wherein said positive going waveform has a positive and negative slope, said positive going waveform generating means further including positive going adjust means for adjusting the positive slope of said positive going waveform during one of said on and off positions of said switching means operatively coupled to said integrating means, negative going adjust means operatively coupled to said integrating means for controlling the negative slope of said positive going waveform during the other of said on and off positions of said switching means; and wherein said negative going waveform has a positive and negative slope, said negative going waveform generating means further including, positive going adjust means operatively coupled to said integrating means for adjusting the positive slope of said waveform during one of said on and off positions of said switching means, and negative going adjust means operatively coupled to said integrating means for adjusting the negative slope of said negative going waveform during the other of said on and off positions of said switching means.

6. A digital to analog waveform synthesizer as set forth in claim 1 wherein said input means included in said positive going waveform generating means further includes an RC network for speeding up turn off and turn on of said switching means; and wherein said input means included in said negative going waveform generating means comprises an RC network for speeding up turn-off and turn-on time of said switching means.

7. A digital to analog waveform synthesizer comprising;

(*a*) input means for coupling digital information thereto;

(*b*) a voltage;

(*c*) switching means operatively connected to said input means and said voltage source for turning on and off said voltage source in response to digital information coupled to said switching means;

(*d*) integrating means connected to the output of said switching means for integrating the output from said switching means;

(*e*) voltage level clamping means operatively connected to said integrating means for clamping the voltage level at said integrating means by a predetermined level during one of said off and on positions in said switching means;

(*f*) and other voltage level clamping means connected to said integrating means for clamping the output of said integrating means at a predetermined level during the other of said on and off positions of said switching means;

(*g*) said synthesizer thereby generating a substantially linear waveform when said switch is turned off and on in response to said digital information.

8. A digital to analog wave synthesizer comprising;

(*a*) input means for coupling digital information thereto;

(*b*) a voltage source;

(*c*) switching means operatively connected to said input means and said voltage source by turning on and off said voltage source in response to digital information coupled to said switching means;

(*d*) integrating means connected to the output of said switching means for integrating the output for said switching means and generating a substantially linear waveform having positive and negative slopes;

(*e*) negative slope adjusting means operatively coupled to said integrating means for adjusting the negative slope to said waveform;

(*f*) and positive slope adjust operatively coupled to said integrating means for adjusting the positive slope of said waveform;

(*g*) said synthesizer thereby generating a substantially linear waveform when said switch is turned off and on in response to said digital information.

References Cited by the Examiner

UNITED STATES PATENTS

| | | | |
|---|---|---|---|
| 2,951,952 | 9/60 | Clapper | 307—88.5 |
| 2,998,532 | 8/61 | Smeltzer | 307—88.5 |
| 3,024,368 | 3/62 | Nagy | 307—88.5 |

MALCOLM A. MORRISON, *Primary Examiner.*